United States Patent
Shih

(10) Patent No.: US 6,555,995 B2
(45) Date of Patent: Apr. 29, 2003

(54) EXTENDED JACKET WITH VIDEO INPUT AND OUTPUT

(75) Inventor: Yu Chiang Shih, Taipei Hsien (TW)

(73) Assignee: Animation Technologies, Inc., Taipei Hsien (TW)

(*) Notice: Subject to any disclaimer, the term of this patent is extended or adjusted under 35 U.S.C. 154(b) by 0 days.

(21) Appl. No.: 10/061,245

(22) Filed: Feb. 4, 2002

(65) Prior Publication Data

US 2003/0062882 A1 Apr. 3, 2003

(30) Foreign Application Priority Data

Sep. 28, 2001 (TW) ...................... 90216777 U

(51) Int. Cl.[7] ............................... G05F 5/00
(52) U.S. Cl. ..................................... 323/299
(58) Field of Search ..................... 323/299, 303, 323/318, 352; 326/37, 136; 439/76.1, 500

(56) References Cited

U.S. PATENT DOCUMENTS 6,361,370 B1 * 3/2002 Neiser .................. 439/638
6,422,944 B1 * 7/2002 Naghi .................. 463/47
6,473,078 B1 * 10/2002 Ikonen et al. .............. 345/211

* cited by examiner

Primary Examiner—Matthew Nguyen
(74) Attorney, Agent, or Firm—Troxell Law Office PLLC

(57) ABSTRACT

An extended jacket with video input and output comprises a CF extended card unit, a digital camera connector, a video input connector, a video input handling unit, a universal connector, a video data storage unit, a read/write control unit, a video data output handling unit, a far end remote control unit and a power supply unit. The extended jacket can output the video signal to a display device (VGA S-VHS/COMPOSITE VIDEO) via an universal connector or the external video signal is imported into the operation system to be edited and treated and is temporarily saved or output to the display device with an added function of CF card extension and an added remote control device for controlling the display on the display device. Additionally, an independent power supply system is equipped internally to prevent a problem resulting from an increased power consumption demands of the PDA and provide a function for facilitating hot insertion and extraction therein.

11 Claims, 5 Drawing Sheets

EXTENDED JACKET WITH VIDEO INPUT AND OUTPUT

BACKGROUND OF THE INVENTION

1. Field of Invention

The present invention relates to an extended jacket with video input and output, and, particularly to an extended jacket, which can be used by, for instance, a universal connector with 100 pins in a personal digital assistant such as the COMPAQ iPAQ for video signals sent to a projection machine, a television/monitor or other video input device from VGA or S-VHS/COMPOSITE VIDEO, and provide CF CARD extension additionally with an external remote control device for controlling the picture. Additionally, the present invention is equipped with an independent power supply system to avoid a problem resulting from increasing power consumption of the PDA with an objective of facilitating hot insertion and extraction.

2. Description of Related Diagrams Illustrations

Due to the progress of electronic technology, consumer electronic devices have been designed not only with complex features but also with miniaturized sizes so that they offer enhanced portability. Hence, the users can carry about the electronic devices with them for increased convenience and use on a daily basis. For example, a personal digital assistant (PDA), very commonly used nowadays, is a kind of electronic device that offers users the preceding functions.

Generally-speaking, the main benefit of a personal digital assistant resides in its ability to store digital data and its small size is suitable for being carried about. From the standpoint of the users, if the personal digital assistant can provide other functions in addition to digital data management, the facility and the practicality of the personal digital assistant will be enhanced substantially.

Currently, the majority of personal digital assistants available in the market are generally manufactured by PALM COMPANY and COMPAQ COMPANY. The iPAQ personal digital assistant fabricated by the COMPAQ is a bright younger generation so that an occupied rate thereof in the market is getting to keep pace with the PALM. The H3630 COMPACT FLASH (abbreviated as CF) extended jacket flash allows the iPAQ personal digital assistant series products to be connected to CF interface extensively such that the users are able to set up CF equipment such as CF modem or CF memory card. Besides, the iPAQ H3630 PCMCIA extended jacket allows the iPAQ personal digital assistant products to be connected to PCMCIA interface extensively such that the users are able to set up PCMCIA equipment such as PCMCIA modem or PCMCIA memory card.

However, it is not possible for the iPAQ series products to transmit the picture on a screen thereof to an external video device or to import an external video signal into the operation system thereof irrespective of the adoption of a CF extended jacket or PCMCIA extended jacket to achieve this goal of external connection with video devices in order to perform a brief report operation with the iPAQ personal digital assistant. This is a limitation of the personal digital assistant.

SUMMARY OF THE INVENTION

Accordingly, an objective of the present invention is to provide an extended jacket with video input and output functionality. The extended jacket can output the video signal to a projection machine, a television/monitor as well as receive video input (S-VHS/COMPOSITE VIDEO) via a pin connector of a PDA such as 100 pin universal connector in a COMPAQ iPAQ External video is also achieved using the added function of an inserted CF card in the built-in CF slot. Infrared receiver on the extended jacket allows for a compatibility with an infrared remote control device. Plus, an internal power supply system is included to avoid a problem resulting from increasing power consumption, with the added benefit of facilitating hot insertion and extraction.

The extended jacket with video input and output according to the present invention comprises a CF extended card unit for inserting a CF card; a digital camera connector for connecting an external digital camera; a video input source such as VCD/DVD player for receiving or handling video input and temporary storage or output of said video input to a display device directly; a video input connector for inputting the video in; a video input handling unit coupled with the video input connector 24 for handling video input, a universal connector 25 being coupled to the CF extended card unit simultaneously connected to a PDA; a video data storage unit being coupled to the digital camera connector and the video input handling unit for temporarily saving the video data, a read/write control unit being coupled to the universal connector, the digital camera connector and the video data storage unit respectively for controlling the time sequence of the video data storage and sending the video data to the PDA via the universal connector; a video data output treat unit being the video data storage unit for outputting the video data to a display device after being treated and saved in the video data storage unit; a far end remote control unit being coupled to the read/write control unit for receiving infrared signals from a remote control device; and a power supply unit providing a direct power source for the extended jacket.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
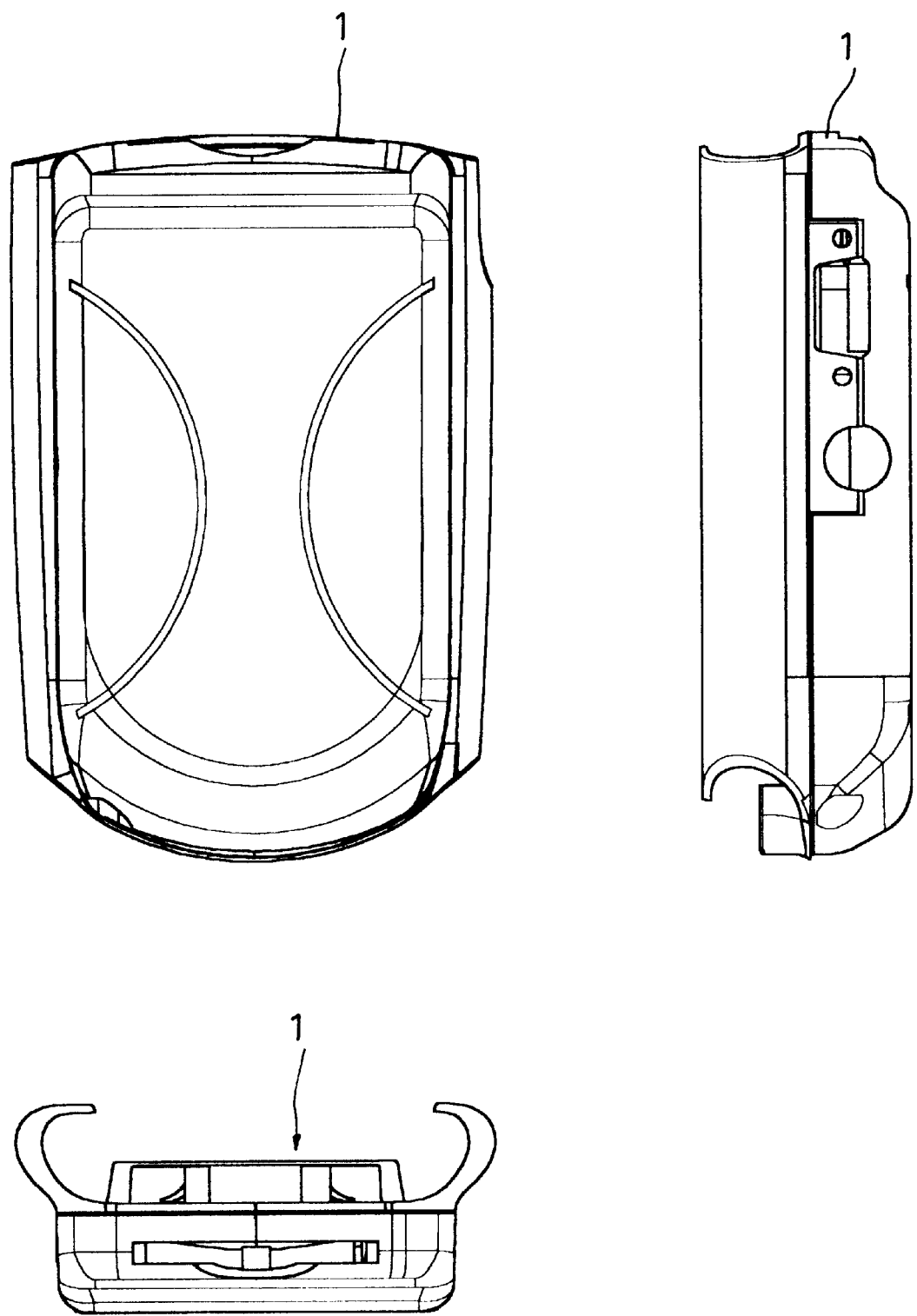
FIG. 1 shows a front view, a top view and a side view of an extended jacket with video input and output according to the present invention in an embodiment thereof.

Referring to FIG. 1, a front view, a top view and a side view of an extended jacket with video input and output according to the present invention in an embodiment thereof are shown. The extended jacket with video input and output 1 is in connection with a full functional multimedia extended jacket of a personal digital assistant (PDA) such as the iPAQ pocket personal computer. The extended jacket 1 functions as a video input/output interface (composite video and S-Video input/output) in addition to offering VGA output. The extended jacket allows the user to use a larger display (supporting VGA, SVGA or XGA) or a television (AV terminal or S-terminal) for exhibition or demonstration with a PDA directly through connection to aforementioned devices.

The extended jacket 1 offers the added advantage that an user can preview or record an image and take a snapshot via iPAQ. In due consideration of the restricted memory in the PDA, the CF card extended slot in the extended jacket 1 will become a useful and effective solution for writing data into the iPAQ and reading data out of the iPAQ. Hence, it is possible for the iPAQ owner to achieve true CF efficiency without the need to alternate between multiple extended jackets.

The extended jacket 1 provides an internal rechargeable Li-on battery that supplies or meets power requirements of the extended jacket. When the extended jacket 1 is in use, it is not necessary to draw upon power from the PDA It is possible to effectively recharge the battery via the PDA or by way of battery charger for supplying the power needed by the jacket. It is beneficial that the battery unit can be recharged directly through the PDA or through convection to a power adapter.

Figure 2:
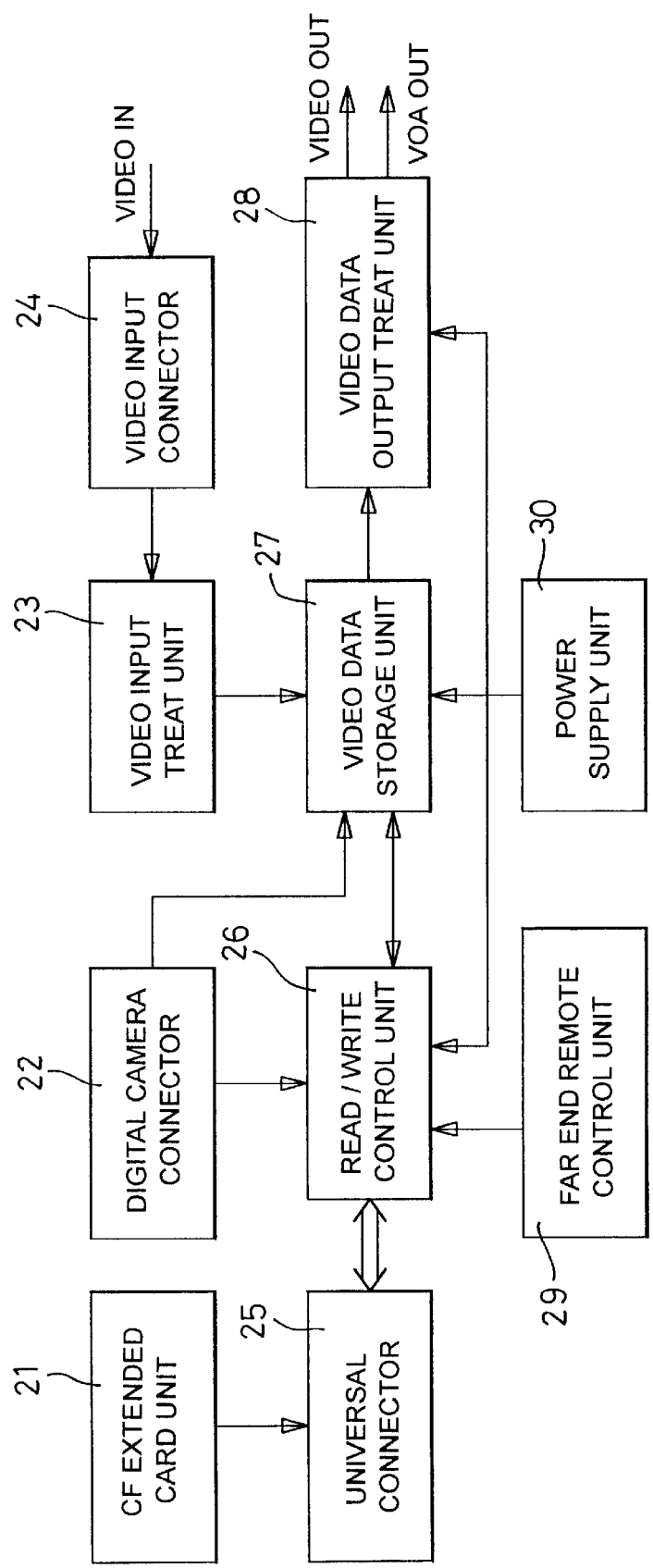
FIG. 2 is a block diagram illustrating an extended jacket with video input and output according to the present invention in the embodiment thereof.

Referring to FIG. 2, a block diagram of the extended jacket with video input and output in the preferred embodiment is illustrated. The extended jacket 1 comprises a CF extended card unit 21 for inserting a CF extended card; a digital camera connector 22 for connecting an external digital camera; a video input source such as VCD/DVD player or video device (not shown) for receiving the video in and temporarily storing or outputting the received video in to a display device directly; a video input connector 24 for inputting the video in; an video input handling unit 23 coupling with the video input connector 24 for treating the video in, a universal connector 25 being coupled to the CF extended card unit 21 being connected to a PDA (not shown); a video data storage unit 27 being coupled to the digital camera connector 22 and the video input handling unit 23 for temporarily saving the video data, a read/write control unit 26 being coupled to the universal connector 25, the digital camera connector 22 and the video data storage unit 27 respectively for controlling the time sequence of the video data storage and sending the video data to the PDA via the universal connector; an video data output treat unit 28 being the video data storage unit 27 for outputting the video data to a displayed device after being treated and saved in the video data storage unit 27; a far end remote control unit 29 being coupled to the read/write control unit 26 for receiving the control from the remote control device and replacing the picture on the display device; and a power supply unit 30 offering direct current power supply (such as 5V) needed by the extended jacket 1.

Analog signals from the video input sources such as the digital camera, the VCD/DVD player, and the video device received by the video input connector 24 can be converted into digital signals by way of the video input handling unit 23. Furthermore, the time sequence for saving the video data is controlled by the read/write control unit 26 such that of the video data is saved in the memory (not shown) of the video data storage unit 27 first and then the video data is sent to the PDA (via the universal connector 25) or sent to the video data output handling unit 28 through a control signal. The output video data is converted into analog signal through the video data output handling unit 28 and video data output handling unit 28 further provides video output connectors such as the CVBS or the S-video and VGA (Analog RGB) an output format so that the video input device (not shown) such as a projection machine, a television/monitor or other device can display the picture.

Figure 3:
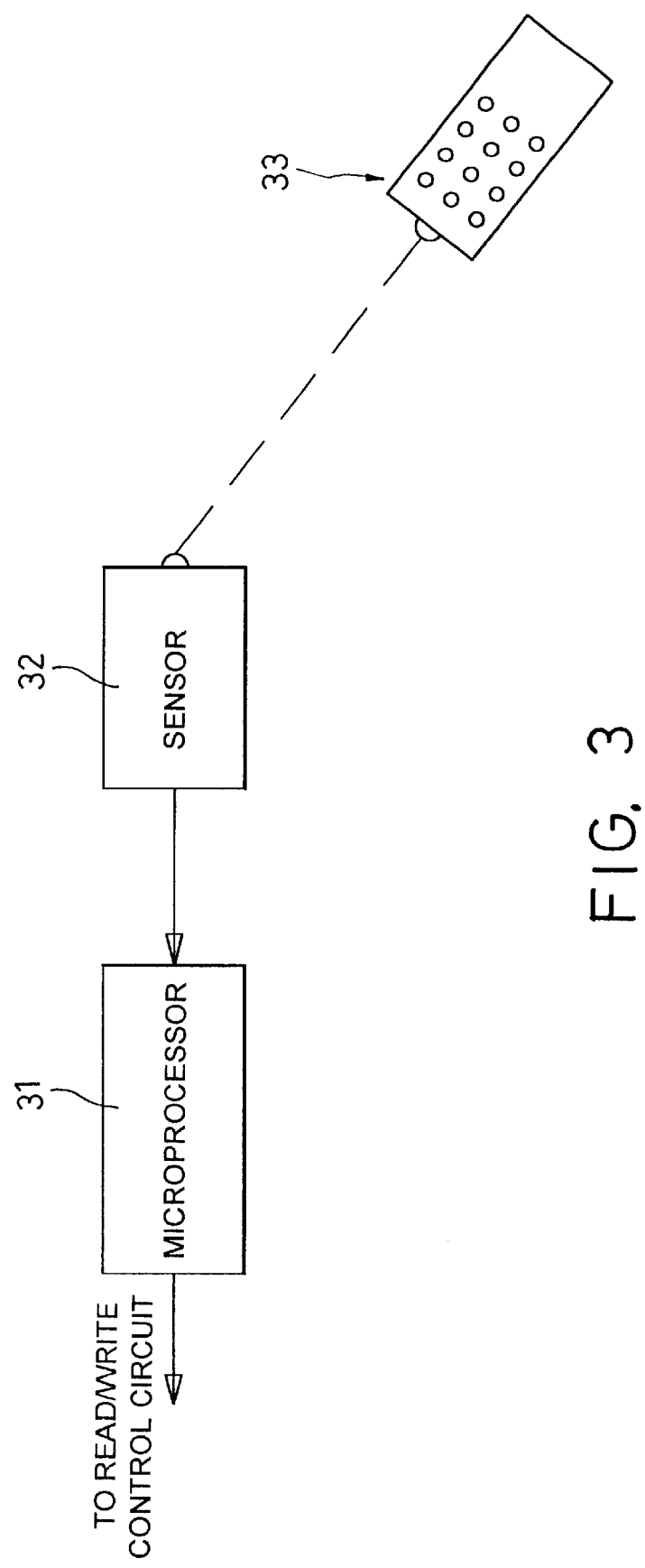
FIG. 3 is a block diagram illustrating a far end remote control unit in an embodiment of the present invention.

Referring to FIG. 3, a block diagram of the far end remote control unit in the preferred embodiment of the present invention is illustrated. The far end remote control unit comprises a sensor 32 for receiving a command signal such as infrared, from a remote control device 33 such that the control signal can be converted into digital signal. A microprocessor 31, which is connected to the sensor 32, can decode the digital signal and send the decoded signal to the read/write control unit 26 to perform the related command. Additionally, the remote control device 33 in practice can be a wireless remote control pen, which is capable of emitting an infrared control signal, or an equally capable mouse or keyboard.

Figure 4:
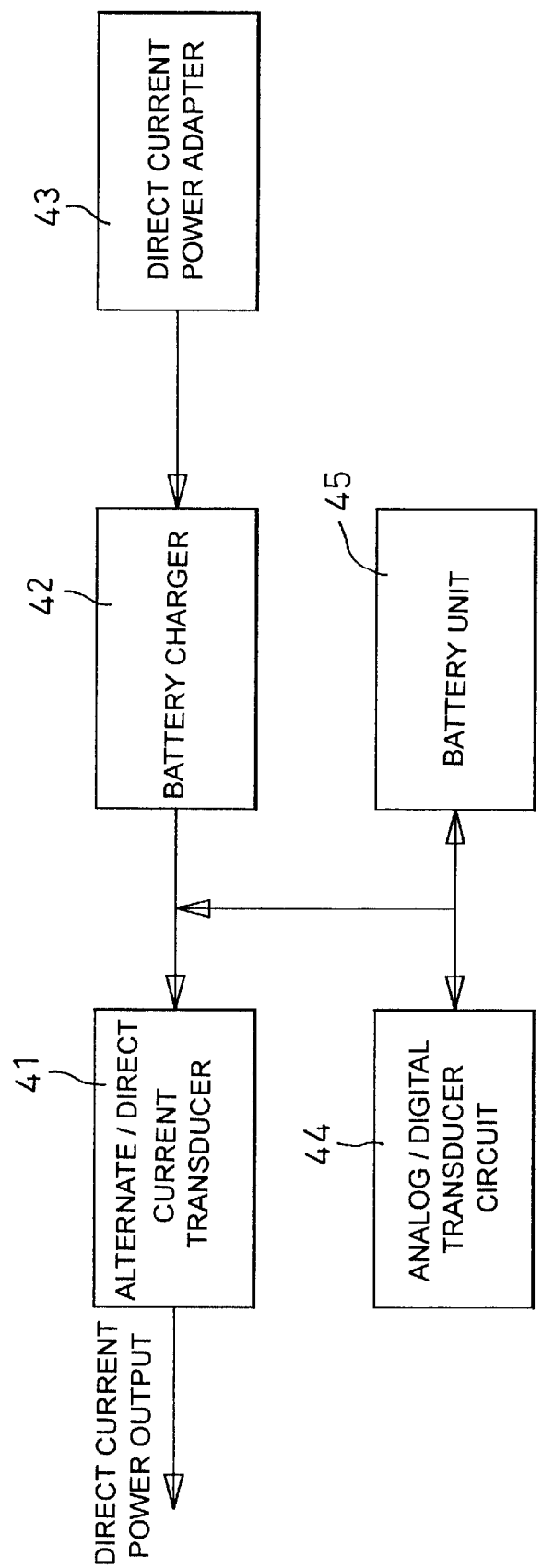
FIG. 4 is a block diagram illustrating a power supply unit in an embodiment of the present invention.

Referring to FIG. 4, a block diagram of the power supply unit in the preferred embodiment of the present invention is illustrated. The power supply unit comprises a direct current power adapter 43 for offering a secondary direct current power source and a battery unit 45 for offering the required power needed by the extended jacket 1; a battery charger 42 being coupled to the direct current power adapter 43 and the battery unit 45 and recharging the battery unit 45 based on the second direct current power, and an alternate/direct current transducer 41 being coupled to the battery unit 45 and the battery charger 42 for converting the second direct current power into a first direct current power. An analog/digital transducer circuit 44 is coupled to the battery unit 45 and the battery charger 42 that detects the potential in the battery unit; and indicates whether the battery unit 45 is in the state of recharging.

Figure 5:
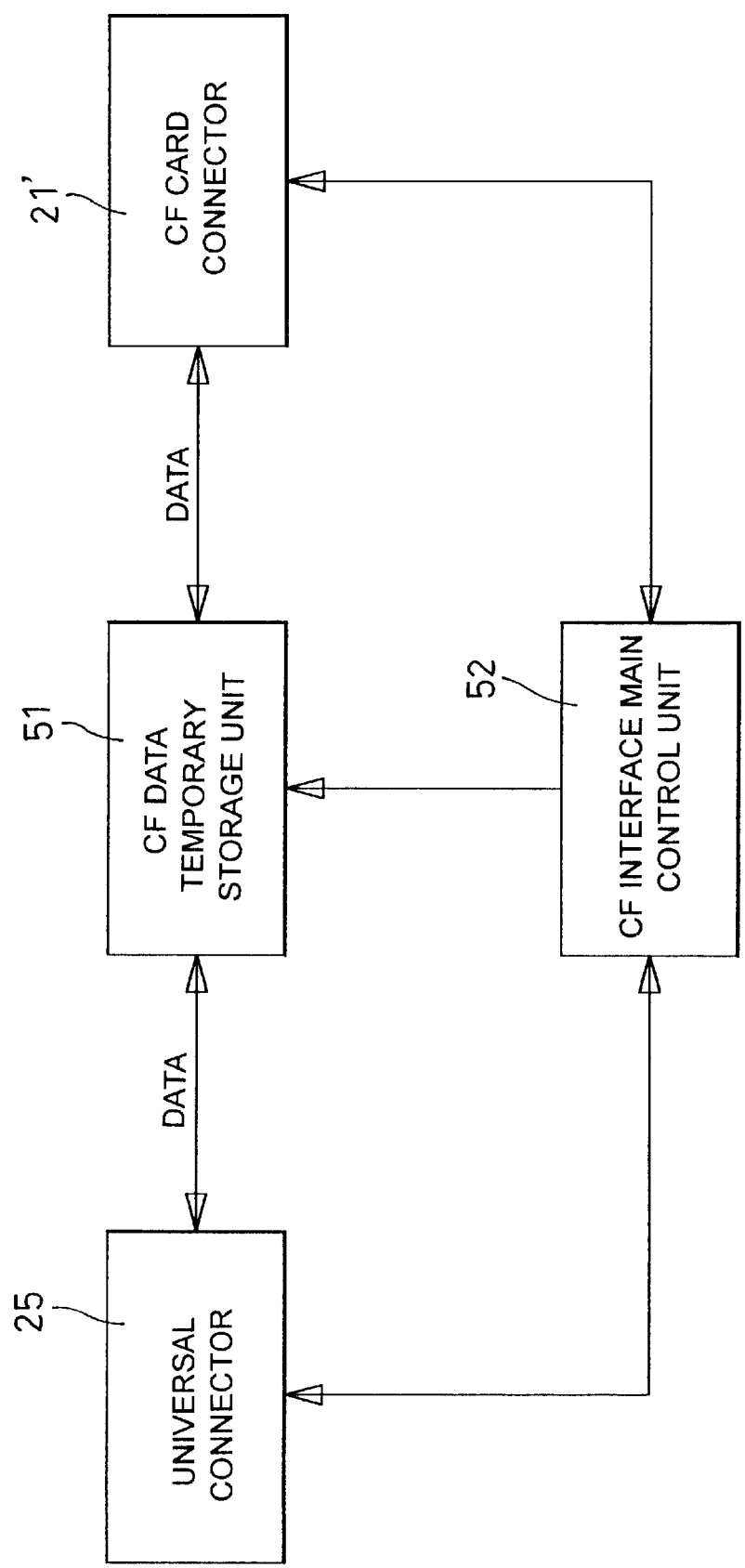
FIG. 5 is a block diagram illustrating a CF extended card unit in an embodiment of the present invention.

Referring to FIG. 5, a block diagram of the CF extended card unit in the preferred embodiment of the present invention illustrated. The CF extended card unit 21 comprises a CF card connector 21' for the insertion of a CF extended card (not shown), a CF data temporary storage unit 51 being coupled to the CF card connector 21' for temporarily saving data in the CF extended card, and a CF interface control unit 52 being coupled to the CF card connector 21' and CF data temporary storage unit 51 and the universal connector 25 for converting the CF interface signal into the main power control. As soon as the CF card is inserted into the CF card connector 21', the data in the CF card is sent to and temporarily stays in the CF data temporary storage unit 51. Then, the CF data is sent to the PDA via the universal connector 25 by way of the CF interface main control unit 52 switching the CF interface. Alternately, the data can be sent by the PDA to the CF data temporary storage unit 51 via the universal connector 25 through the control of the CF interface and then to the CF card connector 21'. Additionally, the CF card connector 21' can be sent to the CF data temporary storage unit 51 through the control of the CF interface main control unit 52 and then sent to the PDA via the universal connector.

From the aforementioned, it can be realized that the extended jacket with video input and output of the present invention is superior to the prior art in that the extended jacket of the present invention makes the video signal be output to the projection machine or the television/monitor from the VGA or S-VHS/COMPOSITE VIDEO via the universal connector in the PDA or can be externally connected to a video input device such as a digital camera, VCD/DVD player to import video for storage or output to a display device. In addition, the present invention provides a function of CF card extension and control of images by way of an added remote control device. Furthermore, the present invention is equipped with an independent power supply system to avoid problems arising from an increased power consumption of the PDA, with the added benefit of hot insertion and extraction.

While the invention has been described with reference to a preferred embodiment thereof, it is to be understood that modifications or variations may be easily made without departing from the spirit of this invention, which is defined in the appended claims.

What is claimed is:

1. An extended jacket with video input and output for offering a personal digital assistant an extended function of video signal input and output, comprising:

a video input connector for importing video in;

a video input handling unit, being coupled to the video input connector for handling the video input a universal connector, being connected to the personal digital assistant;

a video data storage unit, being coupled to the video input handling unit for temporarily storing video data;

a read/write control unit, being coupled to the universal connector and the video data storage unit for controlling a time sequence of saving/reading the video data and sending the video data to the personal digital assistant via the universal connector;

a video input handling unit, being coupled to the video data storage unit for outputting the video data handled by the video input handling unit and saved in the video data storage unit; and a power supply unit, providing the extended jacket a primary direct current power source.

2. The extended jacket according to claim 1, further comprises a far end remote control unit, being coupled to the read/write control unit for receiving a control of a remote control device such that a picture on the display device can be replaced and the personal digital assistant can be controlled to perform various functions.

3. The extended jacket according to claim 2, wherein the far end remote control unit further comprises a sensor, for receiving a control signal of the remote control device and converting the control signal into a digital signal; and a microprocessor, being connected to the sensor for treating the digital signal and sending the treated digital signal to the read/write control unit.

4. The extended jacket according to claim 2, wherein the control signal emitted by the remote control device is infrared.

5. The extended jacket according to claim 4, wherein the remote control device is a wireless remote control pen emitting the infrared control signal or equally, a mouse, or a keyboard with similar infrared capabilities.

6. The extended jacket according to claim 1, wherein the power supply unit further comprises a direct current power adapter, providing a secondary direct current power source;

a battery unit, a battery charger, being coupled to the direct current power adapter and the battery unit for recharging the battery unit based on the secondary current power source;

an alternate current-direct current transducer, being coupled to the battery unit and the battery charger for switching the secondary direct current power source to the first direct current power source; and an analog/digital transducer circuit, being coupled to the battery unit and the battery charger for indicating whether the battery charger is in a state of recharging the battery unit or not.

7. The extended jacket according to claim 6, wherein the battery unit is built-in or is a replaceable unit in the extended jacket.

8. The extended jacket according to claim 1, further comprises a CF extended unit for inserting a CF extended card.

9. The extended jacket according to claim 8, wherein the CF extended card further comprises a CF card connector, being for inserting the CF extended card;

a CF data temporary storage unit, being coupled to the CF card connector for temporarily saving data in the CF extended card; and a CF interface control unit, being coupled to the CF card connector and the CF data temporary storage unit for converting a CF interface signal and controlling the main power control.

10. The extended jacket according to claim 1, further comprises a digital camera connector for inputting an external video input device and coupled to the video data storage unit and the read/write control unit.

11. The extended jacket according to claim 1, wherein the primary direct current power is +5V.

* * * * *